United States Patent [19]

Kiyohara

[11] Patent Number: 4,619,512
[45] Date of Patent: Oct. 28, 1986

[54] AD CONVERSION DEVICE FOR CAMERA

[75] Inventor: Shuichi Kiyohara, Kanagawa, Japan

[73] Assignee: Canon Kabushiki Kaisha, Tokyo, Japan

[21] Appl. No.: 701,419

[22] Filed: Feb. 14, 1985

[30] Foreign Application Priority Data

Feb. 15, 1984 [JP] Japan ................................. 59-27857

[51] Int. Cl.⁴ ............................................ G03B 7/091
[52] U.S. Cl. ..................................... 354/458; 354/420
[58] Field of Search ............... 354/458, 442, 420, 422, 354/423

[56] References Cited

U.S. PATENT DOCUMENTS 4,284,333 8/1981 Kawamura et al. ................ 354/458
4,455,069 6/1984 Kawamura .......................... 354/458
4,462,673 7/1984 Uchidoi et al. ..................... 354/458
4,480,902 11/1984 Kawamura .......................... 354/458

Primary Examiner—Russell E. Adams
Attorney, Agent, or Firm—Toren, McGeady, Stanger, Goldberg & Kiel

[57] ABSTRACT

The disclosed AD conversion device has an AD conversion circuit for AD converting information corresponding to object brightness and other photographic information in a double integrating system. The integrating time for AD converting the photographic information not corresponding to the object brightness is shorter than the integrating time for AD converting the information corresponding to the object brightness.

10 Claims, 4 Drawing Figures

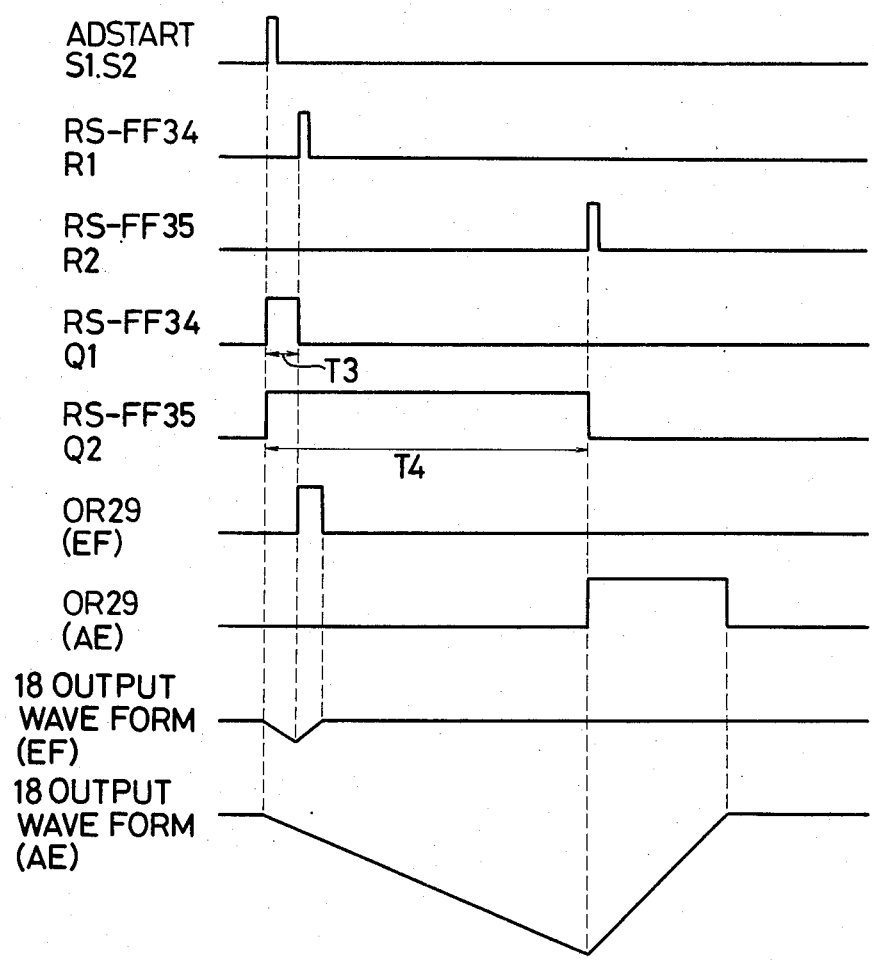
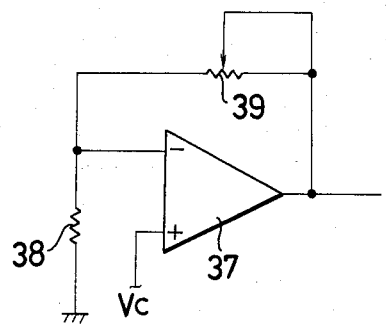

AD CONVERSION DEVICE FOR CAMERA

BACKGROUND OF THE INVENTION

1. Field of the Invention

The present invention relates to an AD conversion device in an integrating system for AD converting the analog information of a camera.

2. Description of the Prior Art

A conventional integrating-type AD conversion circuit for AD converting the analog exposure information of a camera, AD converts an analog signal obtained from the light sensing element for measuring the object brightness. Another conventional system, AD converts analog signals other than those obtained from the light sensing element, for example, analog signals delivered from a flash unit to the camera.

Brightness under room illumination changes at a frequency of 100 Hz or 120 Hz, two times as often as the conventional frequency of 50 Hz or 60 Hz. It is thus necessary to select an integrating time of about 10 msec. for the AD conversion to avoid the influence of changes in brightness of the illumination when the analog signals is obtained from the light sensing element for measuring the object brightness. Thus, in the conventional AD converter for a camera, the integrating time for the AD conversion is selectively set at about 10 msec.

Further, in a conventional camera, the integrating time for the AD conversion of the analog signal transmitted from the flash unit to the camera, despite the absence of any effects of a commercial frequency, is also selectively set at about 10 msec. This is equal to the time for the AD conversion of the analog signal obtained from the light sensing element that measures the object brightness.

A conventional AD conversion circuit of a camera appears in FIG. 1.

FIG. 1 includes an operational amplifier 1, an SPD light sensing element 2 for measuring the object brightness, a diode 3 for logarithmically compressing the photoelectric current, an operational amplifier 4, resistors 8 and 9 for dividing the reference voltage in half, an operational amplifier 10 for buffering the voltage divided by the resistors, analog switches 12 to 15 brought into the conductive state when the control signals are at a high level. Switch 15 serves to reset the charge of a capacitor 17. A resistor 16 determines the integrating current. An integrating capacitor 17 and an operational amplifier 18 together form an integrator. Element 19 is a comparator. A counter latch circuit 20 counts the clock pulses from the start of the output of an RS Flip-Flop (hereinafter called RS-FF) 21 until the start of the output of the comparator 19 and latches the counter with the start of the output of the comparator 19. Element 21 is an RS-FF. A timer circuit 22 produces a pulse after the lapse of a predetermined time, for example, 10 msec. after the start of the ADSTART signal for starting the AD conversion. The circuit also includes an RS-FF 23, an inverter 24, AND gates 25 and 26, and a NOR gate 27.

In operation, the analog exposure information from the flash unit is applied to the one input of the analog switch 12 via the voltage follower of the operational amplifier 1. On the other hand, the photoelectric current corresponding to the object brightness produced by the light sensing element 2 is logarithmically compressed into the light measurement value by a logarithmic compression amplifier composed of the operational amplifier 4 and the diode 3. This compressed value is applied to the analog switch 13.

Further, the voltage Vc is divided in half by the resistors 8 and 9 and applied to the input of the analog switch 14 via the voltage follower of the operational amplifier 10. Before the start of the AD conversion, the ADSTART level is low, the RS-FF 23 is not set so that its output Q is low, while the RS-FF 21 has not been set before the start of the AD conversion, and the analog switch 15 is closed via the gate 27. Thus, the charge in the integrating condenser, composed of the condenser 17 and the operational amplifier 18, is reset and the output of the operational amplifier 18 is Vc.

When the AD conversion then starts and the signal ADSTART rises from an L level, i.e. low, to an H level, i.e. high, the timer circuit 22 starts the clocking or clock pulses, while the RS-FF is set to open the analog switch 15 via the NOR gate 27. When the AE/EF signal for showing whether the flash unit mounted on the camera has been charged or not is high, i.e. when the camera is not yet in the flash mode, the output of the AND gate 26 is high and the analog switch 13 is closed. Consequently, the current proportional to the difference between the voltage corresponding to the object brightness produced by the operational amplifier 4 and the reference voltage Vc flows from the output of the operational amplifier 4 to the integrating capacitor 17 via the analog switch 13 and the resistor 16 so that the integrating capacitor 17 charges and the output voltage of the operational amplifier 18 lowers in proportion to the amount of charge. When the output OUT of the timer circuit 22 is inverted from low to high 10 msec. after the ADSTART changes from low to high, the RS-FF 23 is reset and the output goes low, while the RS-FF 21 is set and its output Q goes high. Thus, the closed analog switch 13 opens and the opened analog switch 14 is closed, while the counter latch circuit 20 starts the counting. Thus, the charge in the integrating capacitor 17 is discharged to the output of the operational amplifier 10 via the resistor 16 and the analog switch 14 in such a manner that when the charge in the integrating capacitor become 0, i.e. when the output of the operational amplifier 18 reaches the reference voltage Vc, the comparator 19 is inverted and the counter latch circuit 20 stops the counting of the clock and latches the clock. The output of the counter latch circuit 20 corresponds to the output of the operational amplifier 4, namely the signal corresponding to the object brightness, which is AD converted.

Until now, the integrating time when the camera is in the flash mode and the output voltage of the operational amplifier, which is the signal from the flash unit, is AD converted is determined by the timer circuit 22 and therefore equal to the integrating time for AD conversion of the analog signal.

On the other hand, a time lag exists between the time a shutterbutton reaches its second step, i.e. its shutter release step, until the actual start of the shutter. This is because the quick mirror in the camera is raised, the diaphragm of the photographic lens is closed by the camera and, for the automatic exposure control, the output of the light sensing element for measuring the object brightness is AD converted to be calculated with other photographic information. This delay creates a danger of missing a shutter chance, i.e. an opportunity to take a picture. It has thus been an important problem to decrease the time lag. A hindrance to decreasing the above-mentioned time lag is that the integrating time of the integrator in the AD conversion circuit for AD converting the analog signal from the flash unit is equal to that of the integrator in the AD conversion circuit for AD converting the output of the light sensing element for measuring the object brightness.

SUMMARY OF THE INVENTION

It is, accordingly, an object of the present invention to decrease the above-mentioned time lag by making the integrating time for AD converting other signals than that corresponding to the object brightness short in the cameras integrating type AD conversion device.

BRIEF DESCRIPTION OF THE DRAWINGS

FIG. 3 is a time chart of an embodiment of the present invention shown in FIG. 2.

FIG. 4 is a block diagram of the embodiment in which another signal is input to the analog switch 12 shown in FIG. 3.

DETAILED DESCRIPTION OF THE PREFERRED EMBODIMENT

Figure 1:
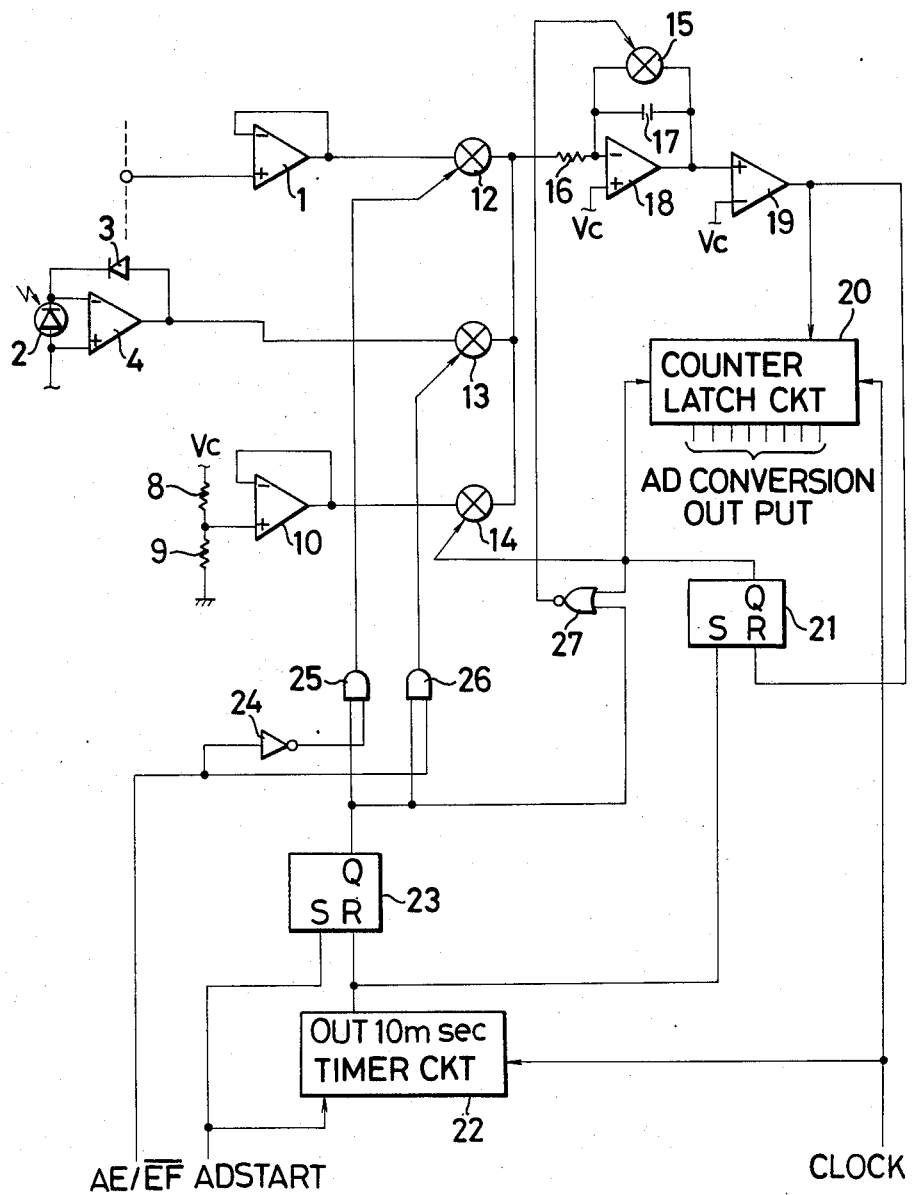
FIG. 1 is a block diagram of the AD conversion device for the conventional camera.
Figure 2:
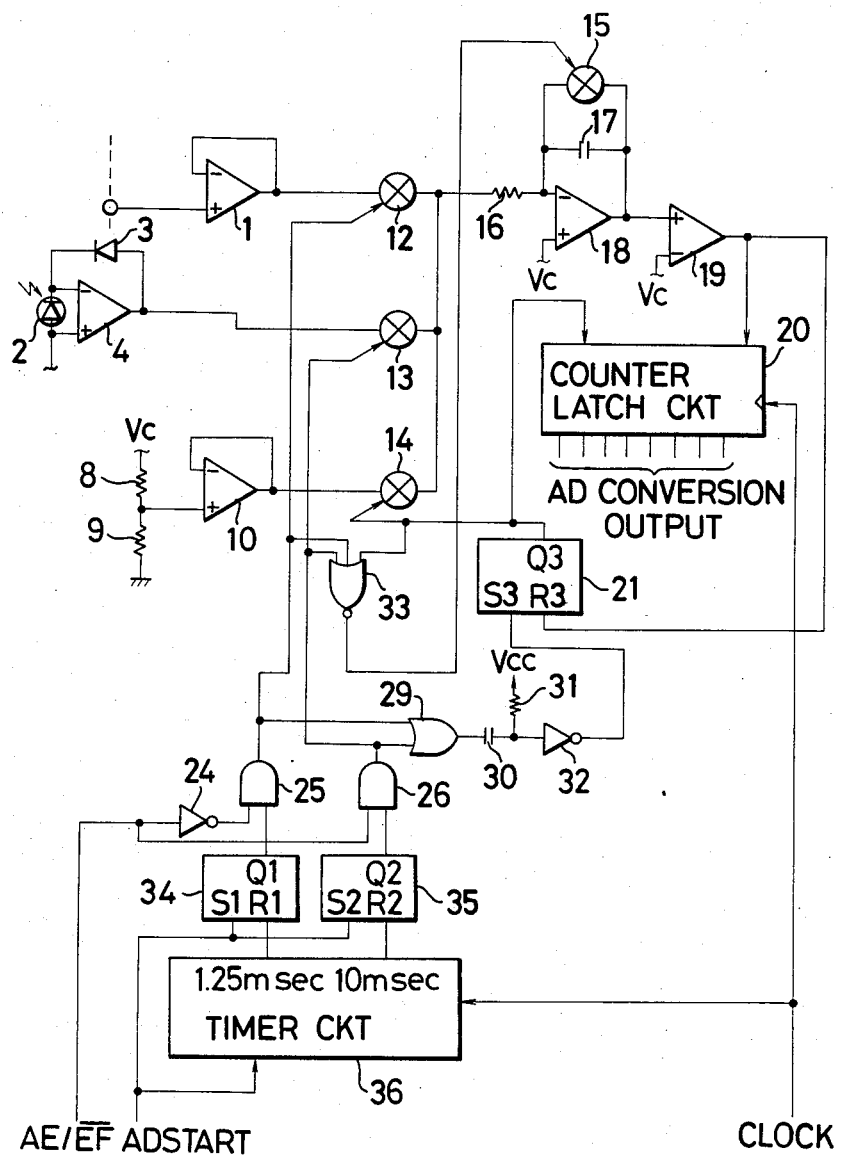
FIG. 2 is a block diagram of the AD conversion device for a camera of an embodiment of the present invention.

FIG. 2 is a circuit diagram of an embodiment of the present invention. The elements in FIG. 2 having the same figures as those in FIG. 1 are the same elements and therefore the explanation is omitted. Element 29 is an OR gate, 30 and 31 are a capacitor and a resistor, respectively, constituting a differentiation circuit, 32 is an inverter, 33 is a NOR gate, 34 and 35 are RS-FFs, respectively, reset by the H level signals produced after 1.25 msec. and 10 msec. clocks of a timer circuit 36 and set by the ADSTART signals. The timer circuit 36 starts the clock with the rising up of the ADSTART signal.

In operation, when the camera is not in the flash mode the AE/EF signal is H level so that the signal via the inverter 24 is L level and the AND gate 25 is closed. Thus, the RS-FF 34 is reset after the lapse of 1.25 msec. after the ADSTART rises from L level to H level and, as is explained with reference to FIG. 1, the output of the operational amplifier 4 starts to be integrated,, while the RS-FF 21 is not set even when the output Q1 of the RS-FF 34 becomes L level. The output of the operational amplifier 4 is integrated as is shown by the output wave form of "RS-FF 35 Q2" and "18 output (AE)" of FIG. 3. After the lapse of T4=10 msec. after the ADSTART signal rises up from L level to H level, the RS-FF 35 is reset. The signal of the output Q2 of the RS-FF 35 which falls from the H level to the L level is differentiated via the OR gate 29 by the capacitor 30 and the resistor 31 and inverted by the inverter 32 to become a pulse signal of H level and set the RS-FF 21. Thus, the analog switch 14 is closed, while the counter latch circuit 20 starts counting. Further, in operative association with the inversion from the H level to the L level of the output Q2 of the RS-FF 35, the analog switch 13 is opened. Thus, the integrating capacitor 17 charges when the output of the operational amplifier 10 starts to discharge. When the capacitor 17 has been completely discharged, the voltage between the both terminals becomes 0 and the output of the operational amplifier 18 reaches the reference voltage Vc, the output of the comparator 19 is inverted from the L level to the H level and the counter latch circuit 20 stops clocking. At this time, the output of the counter latch circuit 20 is latched as a digital value. When the camera is in the flash mode the AE/EF signal is L level so that the signal via the inverter 24 becomes H level and the AND gate 25 is opened. Thus, when the RS-FF 34 is reset after the lapse of T3=1.25 msec. after the ADSTART signal has risen from L level to H level and the output of the operational amplifier 7 starts to be integrated, as shown in the output wave form of "RS-FF 34 Q1" and "18 output (EF)" of FIG. 3, the closed analog switch 12 is opened via the AND gate 25, while the pulse signal is applied to the RS-FF 21 via the OR gate 29 to set the RS-FF 21. Thus, the closed analog switch 14 is opened, the capacitor 17 starts to discharge with the output of the operational amplifier 10, and the counter latch circuit 20 starts counting. When the output of the operational amplifier 18 reaches the reference voltage Vc, the output of the comparator 19 is inverted and the counter latch circuit 20 stops counting to latch the count value.

When the camera is in the flash mode, the integrating time at the AD conversion is shortened in comparison to modes other than the flash mode so that the time until the actual start of the photography is shorter.

In present embodiment, the integrating time when the signal from the flash unit device is made shorter than that when the signal corresponding to the object brightness is AD converted,. However, it goes without saying that a signal other than that corresponding to the object brightness may be AD converted in the AD conversion circuit of a camera in which,, for example, the film sensitivity information, the aperture information and the shutter time information are entered in the camera.

For example, in order to AD convert the aperture information, it is sufficient to provide a circuit shown in FIG. 4 instead of the operational amplifier 1 in FIG. 2.

In FIG. 4, 37 is an operational amplifier, 38 is a resistor and 39 is a variable resistor operatively associated with the rotation of the aperture ring (not shown) of the photographing lens to change the slide position.

As mentioned above, according to the present invention, the AD conversion circuit for the camera which converts the information corresponding to the object brightness and other photographic information with the double integrating system is provided with a control means for making the integrating time when photographic information other than the information corresponding to the object brightness are AD converted shorter than the time when the information corresponding to the object brightness is AD converted. Thus, the time lag between the second stroke of the shutter is decreased button and the actual start of the shutter, which is quite effective.

What is claimed is:

1. An AD conversion device for a camera comprising:
   (A) a double integrating type AD conversion circuit for integrating information corresponding to object brightness for a prescribed length of time and thereafter inversely integrating the thus integrated value at a constant speed; and
   (B) a control circuit for controlling an integrating time of the AD conversion circuit to carry out the AD conversion, said control circuit including:
   (a) a first mode for AD converting information corresponding to an object brightness; and (b) a second mode for AD converting information other than the information corresponding to the object brightness, the integrating time for the information other than the information corresponding to the object brightness in said second mode being different from the prescribed length of the integrating time for the information corresponding to the object brightness in the first mode.

2. An AD conversion device according to claim 1, further comprising:
(A) means for changing the mode of the control circuit in accordance with the kind of information to be AD converted.

3. An AD conversion device for a camera comprising:
(A) a double integrating type AD conversion circuit for integrating input signals for a prescribed length of time then thereafter reversely integrating thus integrated value with a constant speed, and
(B) a control circuit for controlling an integrating time of the AD conversion circuit to carry out the AD conversion, said control circuit including:
(a) a first mode for AD converting information corresponding to the object brightness; and
(b) a second mode for AD converting information not corresponding to the object brightness and for making the integrating time for the information not corresponding to the object brightness in said second mode being shorter than the integrating time for the information corresponding to the object brightness in the first mode.

4. An AD conversion device according to claim 3, further comprising:
(A) means for changing the mode of the control circuit in accordance with the kind of information to be AD converted.

5. An AD conversion device according to claim 3, wherein the information not corresponding to the object brightness is a signal from a flash device.

6. An AD conversion device according to claim 3, wherein the information not corresponding to the object brightness is aperture information.

7. An AD conversion device according to claim 3, wherein the information not corresponding to the object brightness is a shutter time.

8. An AD conversion device for a camera comprising:
(A) a double integrating type AD conversion circuit for integrating input signals for a prescribed length of time then thereafter reversely integrating thus integrated value at a constant speed; and
(B) means for changing an integrating time of input signals to the AD conversion circuit in accordance with the kind of input signals to be AD converted.

9. An AD conversion device according to claim 8, wherein the means for changing the integrating time of the AD conversion circuit makes the integrating time when the input signals to be AD converted do not correspond to the object brightness shorter than the integrating time when the input signal correspond to the object brightness.

10. For a camera responsive to exposure values and other values, a system for converting the values to digital data, comprising:
circuit means for receiving the values;
an analog to digital converter responsive to said circuit means and having an integrator for integrating the values over given times; and
control means coupled to said converter for changing the integrating time of the integrator on the basis of whether the value converted is an exposure value or another value.

* * * * *